United States Patent [19]

Huang et al.

[11] Patent Number: 4,716,350
[45] Date of Patent: Dec. 29, 1987

[54] METHOD TO AVOID SINGULARITY IN A ROBOT MECHANISM

[75] Inventors: Bernard Huang, Ann Arbor; Veljko Milenkovic, Birmingham, both of Mich.

[73] Assignee: Ford Motor Company, Dearborn, Mich.

[21] Appl. No.: 939,377

[22] Filed: Dec. 8, 1986

[51] Int. Cl.$^4$ ............................................. G05B 19/10
[52] U.S. Cl. ..................... 318/568; 318/567; 318/566; 901/2; 901/3; 364/513
[58] Field of Search ............... 318/568, 568 C, 568 D, 318/568 E, 568 G, 568 M, 566, 567, 569, 573, 574, 597, 598, 560, 565, 570, 576, 561, 562, 577; 901/2–25, 27, 29; 364/478, 513, 169

[56] References Cited

U.S. PATENT DOCUMENTS

| | | | |
|---|---|---|---|
| 4,068,156 | 1/1978 | Johnson et al. | 901/9 X |
| 4,467,436 | 8/1984 | Chance et al. | 364/513 |
| 4,528,632 | 7/1985 | Nio et al. | 901/2 X |
| 4,547,858 | 10/1985 | Horak | 364/513 |
| 4,550,383 | 10/1985 | Sugimoto | 318/568 C X |
| 4,594,671 | 6/1986 | Sugimoto et al. | 901/3 X |
| 4,604,561 | 8/1986 | Kamajima et al. | 318/567 |
| 4,604,716 | 8/1986 | Kato et al. | 318/567 X |
| 4,680,519 | 7/1987 | Chand et al. | 901/3 X |

Primary Examiner—William M. Shoop, Jr.
Assistant Examiner—Paul Ip
Attorney, Agent, or Firm—Frank G. McKenzie; Donald J. Harrington

[57] ABSTRACT

A method to avoid excessive rotational speeds, of the axes of a robot wrist, that result in the vicinity of a singularity in the path defined by consecutive points along which a tool held by a three-axis wrist mechanism of the robot moves. The speeds of the first and third axes are reduced within the allowable range of rotational speed for these axes, generally defined by the robot manufacturer, while maintaining constant the rotation about the intermediate or second joint. The rotational speed about each of these axes is determined as the tool moves between successive points on the path. Then, if necessary, the rotation of the second joint is decreased while maintaining constant the speeds about the first and third axes. Finally, the tool is maintained on the path by rotating the position of the tool without altering the reduced speeds of rotation about the axes.

6 Claims, 4 Drawing Figures

METHOD TO AVOID SINGULARITY IN A ROBOT MECHANISM

BACKGROUND OF THE INVENTION

1. Field of the Invention

This invention relates to the field of control systems for industrial robots and, more particularly, pertains to control systems that guide the movement of a tool held by a robot arm along a predetermined path.

2. Background of the Invention

In the wrist mechanism of an industrial robot, among all possible combinations of mechanisms having as many as three joints whose axes are mutually perpendicular or parallel, only those whose consecutive joints are mutually perpendicular can produce as many rotational degrees of freedom as the number of joints in the mechanism. However, three-axis wrist mechanisms have certain mechanical limitations, kinematic anomolies called by "gimbal lock", which deteriorate the performance of the wrist is a region within the working envelope. When the third axis of the wrist becomes parallel to the first axis, gimbal lock occurs. This condition causes the wrist mechanism to loose one degree of freedom. To overcome these limitations, some robots use either oblique chain or compound chain linkages, wherein the articulation occurs other than with rotary or sliding joints or by connecting the links to two or more other links.

An effective design that eliminates wrist anomolies divides the total pitch and yaw articulations into several smaller parts. A wrist employing this technique uses more than three rotary joints suitably constrained to result in no more than three overall degrees of freedom. The articulation of individual joints is reduced, although the range of overall articulation may be increased.

Three-axis robot wrist mechanisms exhibit singularities which restrict their mobility at certain orientations of the end-effector or tool carried by the robot arm. Near singularities, the rotational speeds about certain axes of the wrist mechanism rise to very high speeds to achieve the desired motion of the tool. Often the required speed of rotation about the wrist mechanism axes exceeds the design limits. The speed of the tool may have to be reduced greatly until it passes the region of the singularity, but this is generally unacceptable because either the application requires smooth continuous motion or the period for the operation performed by the robot becomes too long.

SUMMARY OF THE INVENTION

One way to resolve the singularity problem in a wrist mechanism is to alter the end-effector orientation slightly in the region of the singularity. The largest angular change between the actual orientation and planned orientation depends on the ratio of the maximum rated angular speed of the wrist axes to the desired rotational speed component of the end-effector in the region of the singularity. It is desirable that this angle be within the range 10°–20° for most industrial robot wrists. The method according to this invention compares the allowable rotational speed of the axes of the wrist to the planned rotational speed and alters the orientation path of the end-effector accordingly without altering the translational motion of the center point of the tool.

Generally, a path defined by consecutive points to be followed by the end-effector is generated and the end-effector moves between consecutive points in a constant time interval, but the distance between the points can vary. Whether singularities exist in the path can be determined by examining the amount of rotation that occurs about each axis of the wrist mechanism as the end-effector moves along the path. As the path approaches a singular region, the speeds of some axes begin to approach the allowable rated speed, which is usually determined by the manufacturer of the robot. In the immediate region of the singularity, the allowable speeds are exceeded by the actual actual speeds of rotation about the axis of the wrist mechanism.

The method according to this invention avoids singularities in the path followed by a robot end-effector supported by a wrist mechanism that includes rotatable joints whose allowable speeds of rotation about their axes are predetermined. In the region of the singularities, the actual speeds of rotation about the axes are compared to corresponding allowable speeds to determine if a correction is required. Then, while maintaining constant the amount of rotation of one joint of the wrist mechanism, the rotation of two of the joints is reduced at each of the points in the region of the singularity so that the rotational speeds are less than the allowable rotational speeds. These corrections are made consecutively at each point on the path in both directions beginning at the singular point until a point is reached where speed correction is no longer required. Next, a speed comparison is made for the other joint of the wrist mechanism. If a correction is required, the speed of rotation about that axis is reduced while holding constant the amount of rotation about the first two joints, whose speeds were previously corrected, until the speed of rotation about the other axis is no greater than the allowable rotational speed about that axis.

Finally, the end-effector is maintained on the path by rotating its position without altering the corrected rotations of the joints of the wrist mechanism at the points on the path in the region of the singularity.

DESCRIPTION OF THE PREFERRED EMBODIMENT

Figure 1:
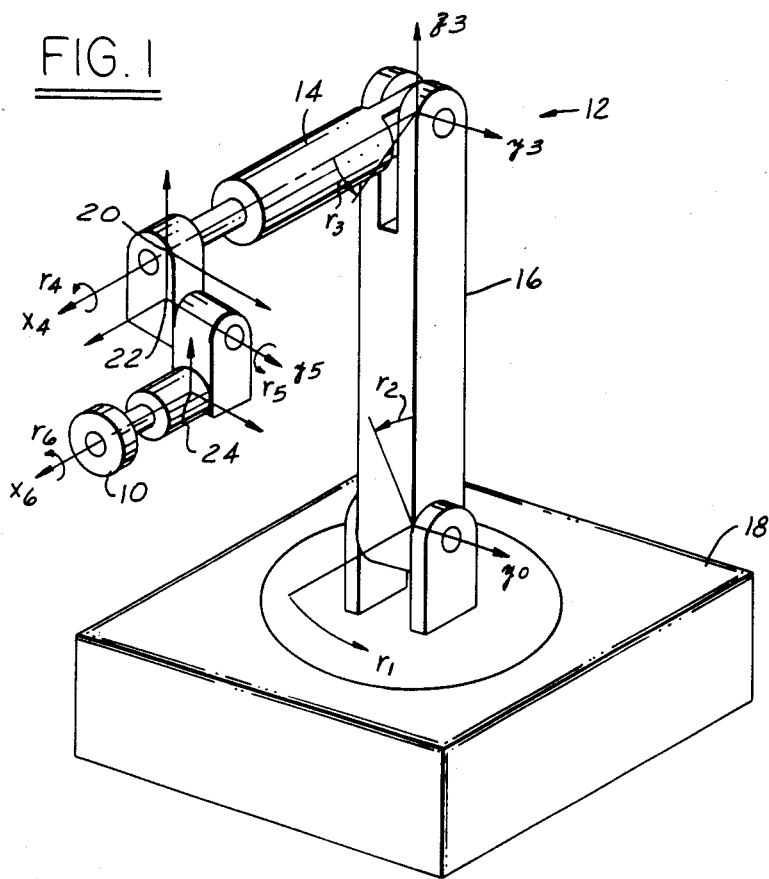
FIG. 1 is an isometric schematic representing the major linkage and minor or wrist linkage that connects the robot arm to the robot hand, on which the tool or end-effector is carried.

An articulated mechanism for moving an end-effector or tool carried by a hand 10 of an industrial robot includes a major linkage 12, comprising a robot arm 14 and a boom 16 mounted on a base 18, hich is fixed to ground. The arm is supported for pivoting about an axis $y_3$; the boom is supported for rotation about axis $z_3$ and for pivotal movement about axis $y_0$. The direction of positive rotation about these axes is represented by $r_3$, $r_2$ and $r_1$, respectively. The major linkage produces gross motion of the end-effector as a result of selective rotation about these axes, but the minor linkage 18, called the wrist mechanism, produces more precise definition of the position and orientation of the end-effector as it moves along a predetermined path defined by consecutive points whose coordinate are predetermined.

The minor linkage or wrist include a first joint 20 mounted for rotation about axis $x_4$, a second or intermediate joint 22 pivotable about axis $y_5$ and a third joint 24 pivotable about axis $x_6$. The positive sense of rotation about axes $x_4$, $y_5$ and $x_6$ is represented by $r_4$, $r_5$ and $r_6$, respectively.

Generally, the joints that comprise the major linkage include combinations of rotary and sliding joints, the succesive ones being parallel or perpendicular. The joints that comprise the minor linkage generally include only rotary joints. Rotation of the hand about an axis parallel to the arm is called roll motion; rotation of the hand about a horizontal axis perpendicular to the arm is called pitch motion; and rotation about an axis perpendicular to these two axes is called yaw motion. The allowable rotational speeds of the joints of the major and minor linkages are generally known and available from the robot manufacturer. In the region of singularity, the rotational speeds about the axes of the wrist mechanism can exceed the allowable speeds unless the rate at which the end-effector moves along the path is slowed or some other action is taken to avoid the singularity.

Figure 2:
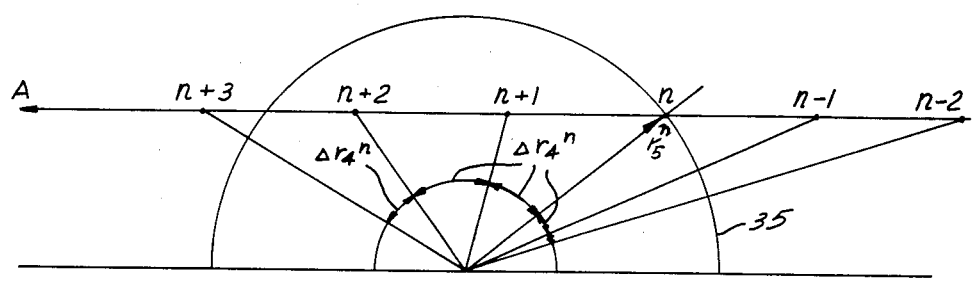
FIG. 2 is a diagram in polar coordinates representing the rotational states at the points on a path followed by the robot tool as it passes through the region of a singularity. The rotations of two axes of the robot wrist are plotted. The rotation about one of the axes is the degree of freedom lost at the singularity.

The end-effector moves during fixed time intervals between the points that define the path it follows. Whether singularities exist within the working range of the path can be determined by examining the speed of rotation of the joints of the wrist mechanism as the end-effector moves from point-to-point. FIG. 2 shows various states of rotation, $(n-1)$ to $(n+3)$, about axes $x_4$ and $x_5$ as the end-effector moves along the path in the vicinity of a singularity. The rotation $r_4$ is represented by the angle measured between radii from the origin to the points, and the rotation $r_5$ is represented by the length of the radius vector from the origin to the points. The speed of rotation about an axis can be determined by dividing the difference between the joint rotations at two consecutive points by the fixed time interval during which the end-effector moves between the points. Ideally, the rotational speed of each joint 20, 22, 24 should be well below the maximum rated or allowable speed of that joint. However, as the path approaches the region near a singularity, the speeds of certain axes begin to approach the maximum rated or allowable speed. In the singular region, the rotational speed of these axes exceeds the allowable speed. For example, as the path approaches the singular region represented in FIG. 2, the speed of rotation about axis $x_4$, $(r_4{}^{n+1} - r_4{}^n)/\Delta t$ or $\Delta r_4/\Delta t$, increases rapidly until it exceeds the allowable speed of joint 20.

To determine whether a singularity exists within the path, the rotational speed of the axes of the wrist mechanism is compared to the allowable rotational speed of these axes. The critical point in the path in the region of the singularity is the point where $\Delta r_4$ or $\Delta r_6$ is a maximum. In FIG. 2, point $n+1$ is the critical point. After the critical point is determined, and if the rotational speeds about axes $x_4$ or $x_6$, as determined by the method previously described, exceed the allowable rotational speeds for these axes, then the speeds $\Delta r_4$ and $\Delta r_4$ are reduced while maintaining constant the rotation $r_5$ about axis $y_5$.

Figure 3:
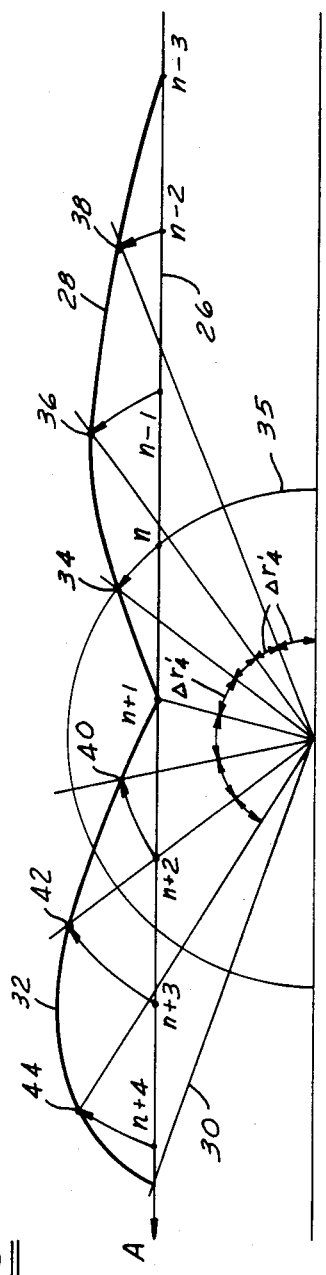
FIG. 3 is a diagram in polar coordinates showing the position of the points representing the rotational states on the path relocated to reduce the amount of rotation of one of two axes of the robot wrist as the tool moves between successive points on the path.

FIG. 3 presents graphically this technique for reducing the rotational speed about axis $x_4$, but the technique can be applied in a similar way with respect to rotation about axis $x_6$. First, beginning with point n adjacent the critical point $n+1$, the rotational speed $\Delta r_4$ about axis $x_4$ in moving the end-effector from point n to point $n+1$ is reduced while maintaining $r_5$ constant. This is represented graphically in FIG. 3 by rotating point n to 34 on a unit circle 35 whose radius is $r_5$ until $\Delta r_4$, the angle between the radii from the origin to points $n+1$ and 34, is not greater than the allowable rotational speed $\Delta r'_4$ about axis $x_4$.

Similarly, the speed of rotation about axis $x_4$ in moving the end-effector from point $n-1$ to point $n-2$ is reduced while maintaining $r_5$ constant. This is represented graphically in FIG. 3 by rotating point $n-1$ to point 36 on a unit circle whose radius is rotation $r_5$. Similarly, point $n-2$ is rotated to point 38. Point $n-3$ requires no change because in its original location $\Delta r_4$, represented by the angle between radii from the origin to points 38 and $n-3$, is less than the allowable speed, $\Delta r'_4$.

The rotational speed about axis $x_4$ as the end-effector moves from point $n+1$ to point $n+2$ must be reduced to a value not greater than the allowable speed because as FIG. 2 shows, the angle between radii from the origin to points $n+1$ and $n+2$ exceeds the allowable speed, $\Delta r'_4$. This speed reduction is represented in FIG. 3 by rotating point $n+2$ to 40 on a unit circle whose radius is $r_5$ until $\Delta r_4$ is reduced to $\Delta r'_4$. Similarly, the rotational speed about $x_4$ in moving the end-effector from point $n+2$ to point $n+3$ is reduced to a speed not greater than the allowable speed $\Delta r'_4$. This is represented in FIG. 3 by rotating point $n+3$ to point 42 on a unit circle having a radius equal to $r_5$ until $\Delta r_4$ is reduced to $\Delta r'_4$.

This process continues outwardly from the critical point in both directions to consecutive points further away from critical point until all of the rotations $r_4$ and $r_6$ in the vicinity of the singularity are reduced to a value not greater than $\Delta r'_4$ and $\Delta r'_6$, respectively. In this process, the amount of rotation $r_5$ about axis $y_5$ is maintained at the same angle as it had before the speed reduction about axes $x_4$ and $x_6$.

Figure 4:
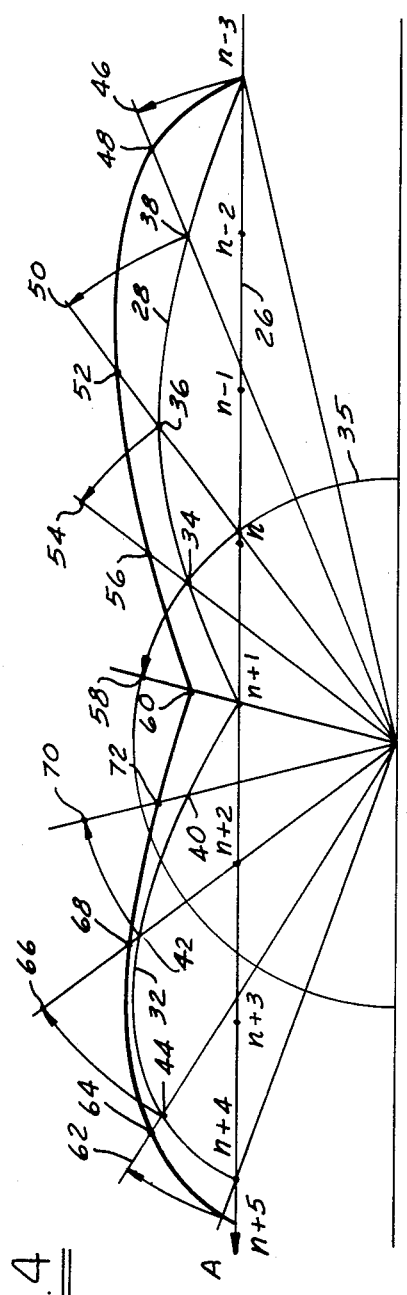
FIG. 4 is a diagram in polar coordinates showing the points representing the rotational states on the path relocated to permit a reduced amount of rotation of the other joint of the wrist mechanism.

The original rotational states represented by points n, $n-1$, $n-2$ and $n-3$ in the region of the singularity that precede the critical point are shown in FIGS. 3 and 4 in the original state 26 and in the first revised state 28. Similarly, the original and the revised rotational states 30, 32 at the points in the region of the singularity that follow the critical point are shown in FIGS. 3 and 4.

Next, the speed of rotation at the various points on the path, $r_5{}^n$, about axis $y_5$ is corrected to a value not greater than the allowable rotational speed about the $y_5$ axis, $\Delta r'_5$. However, this speed adjustment is made at consecutive points on the path beginning at those points farthest from the critical point that required reduction of the speed about axes $x_4$ and $x_6$.

The rotational speed $\Delta r_5$ about axis $y_5$ is compared to the allowable rotational speed $\Delta r'_5$ about this axis, and adjustments are made so that the final rotational speed is no greater than the allowable rotational speed. FIG. 4 graphically illustrates the procedure for making this correction. First, the speeds about axis $y_5$ corresponding to the point in the region of the singularity on both sides of the critical point that are farthest from the critical point and previously required speed reduction about axes $x_4$ and $x_6$ are compared to the allowable rotational speed $\Delta r'_5$ about axis $y_5$. The rotational state represented by point n−3 is rotated to point 46, a point on the radius vector through point 38, on a unit circle having a radius from the origin to point n−3. The distance measured on the radius vector between points 46 and 38 represents the speed of rotation about axis $y_5$ as the end-effector moves from point n−3 to point n−2 during a constant time interval. If that speed exceeds the allowable speed of rotation about axis $y_5$, then a new state 48 is defined such that speed $\Delta r_5$ does not exceed the allowable speed $\Delta r'_5$.

Similarly, a comparison is made between the rotational state represented by point 38 and the state represented by the point next closest to the critical point. This procedure is again represented graphically with reference to FIG. 4. The rotational state represented by point 38 is rotated on a unit circle drawn from the origin to point 50, which is located on the radius vector drawn through point 36, the previously revised position of point n−1. Then a comparison is made between the speed represented by the distance between points 36 and 50 on the common radius vector on which they are located. If this speed exceeds the allowable speed of rotation $\Delta r'_5$, a new point 52 is defined such that the speed represented by the distance on the common radius vector between points 36 and 52 is a speed that is not greater than the allowable speed.

This process is continued for rotational states represented by the point that is next closest to the critical point. For example, the rotational state represented by point 36 is rotated on a unit circle drawn from the origin to point 54. Next, a comparison is made between the speed represented by the distance between points 34 and 54 on the radius vector to the allowable speed of rotation $\Delta r'_5$. If that speed exceeds the allowable speed, a new point is defined at 56 such that the speed represented by the distance between points 34 and 56 is not greater than the allowable speed of rotation. Similarly, point 34 is rotated on the unit circle shown in FIG. 4 to a point on the radius vector from the origin through point n+1. This defines point 58. Then a comparison is made between the rotational speed represented by the distance between point 58 and point n+1. If this speed exceeds the allowable speed about axis $y_5$, a new point 50 is defined at 60 such that the distance on the radius vector between points n+1 and 60 is not greater than the allowable speed of rotation $\Delta r'_5$.

In a similar way, the states of rotation, which correspond to the points on the path that follow the critical point as the end-effector moves along the path in the region of the singularity, are redefined. Point 62 is the result of rotating point n+5 on a unit circle drawn from the origin to the radius vector that passes through the preceding point 44, which corresponds to the previously revised rotational state originally represented by point n+4. The rotational speed $\Delta r_5$ about axis $y_5$ represented by the distance between points 44 and 54 is then set so that it does not exceed the allowable rotational speed. Next, point 44 is rotated on a unit circle to the radius vector that passes through point 42, which is the rotational state originally represented by point n+3. Next, a new point 68 is defined such that the speed represented by the distance between points 68 and 42 is not greater than the allowable rotational speed about axis $y_5$. Then point 42 is rotated on a unit circle drawn from the origin to the radius vector that passes through point 40, the rotational state originally represented by point n+2. A new point 72 is defined such that the speed of rotation represented by the distance between points 40 and 72 does not exceed the allowable rotational speed about axis $y_5$.

The final rotational states are represented by the curve that contains points 48, 52, 56, 60, 72, 68, 64 and the other points of the original path that are beyond the region of singularity. Then, the end-effector is maintained on the path by rotating its position by manipulating the major linkage 12 without altering the reduced amount of rotation of the joints of the wrist mechanism when the end-effector is located at the points in the region of the singularity. If necessary, $r_4$, $r_6$ and $r_5$ can be checked again against the allowable speed of rotation about the corresponding axis and the speeds readjusted according to the procedure previously described.

Having described the preferred embodiment of our invention, what we claim is:

1. A method to avoid a singularity in a path defined by consecutive points to be followed by a robot end-effector supported by a wrist mechanism that includes first, second and third rotatable joints comprising:
   determining allowable rotational speeds of the first and third joints;
   maintaining constant the amount of rotation about the second joint corresponding to the points in the region of the singularity;
   reducing the amount of rotation of the first and third joints corresponding to the points in the region of the singularity so that the rotational speeds of said joints are no greater than the allowable rotational speeds of said joints as the end-effector follows the path; and
   maintaining the end-effector on the path by rotating the position of end-effector without altering the reduced amount of rotation of the joints of the wrist mechanism at the points in the region of the singularity.

2. The method of claim 1 further comprising:
   determining the allowable rotational speed of the second joint;
   maintaining constant the amount of rotation about the first and third joints corresponding to the points in the region of the singularity;
   reducing the amount of rotation of the second joint at the points in the region of the singularity so that the rotational speed of the second joint is no greter than the allowable rotational speed of said joint; and
   maintaining the end-effector on the path by rotating the position of the end-effector without altering the reduced amount of rotation of the joints of the wrist mechanism of the points in the region of the singularity.

3. The method of claim 1 further comprising:
   determining the critical point in the region where the singularity exists; and
   reducing the amount of rotation of the first and third joints beginning at the critical point and thereafter at consecutive points that precede the critical point in the region of the singularity so that the rotational speeds of the first and third joints are no greater than the allowable rotational speeds of said joints.

4. The method of claim 2 further comprising:
determining the critical point in the region where the singularity exists; and
reducing the amount of rotation of the second joint beginning at the critical point and thereafter at consecutive points that precede the critical point in the region of the singularity so that the rotational speed of the second joint is no greater than the allowable rotational speed of said joint.

5. The method of claim 1 further comprising:
determining the critical point in the region where the singularity exists; and
reducing the amount of rotation of the first and third joints beginning at the critical point and thereafter at consecutive points succeeding the critical point in the region of the singularity so that the rotational speeds of the first and third joints are no greater than the allowable rotational speeds of said joints.

6. The method of claim 2 further comprising:
determining the critical point in the region where the singularity exists; and
reducing the amount of rotation of the second joint beginning at the critical point and thereafter at consecutive points succeeding the critical point in the region of the singularity so that the rotational speed of the second joint is no greater than the allowable rotational speed of said joint.

* * * * *